Dec. 15, 1964    P. J. MORE    3,161,757
COOKING APPLIANCE
Filed March 26, 1962    3 Sheets-Sheet 1

INVENTOR.
Philip J. More
BY
Andrew G. Hubbard
ATTY.

Dec. 15, 1964
P. J. MORE
3,161,757
COOKING APPLIANCE
Filed March 26, 1962
3 Sheets-Sheet 2
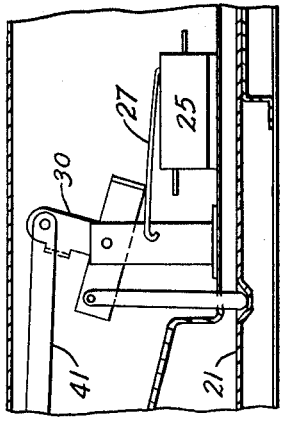
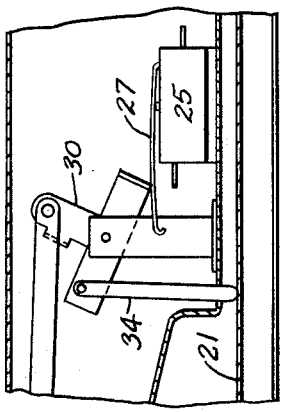
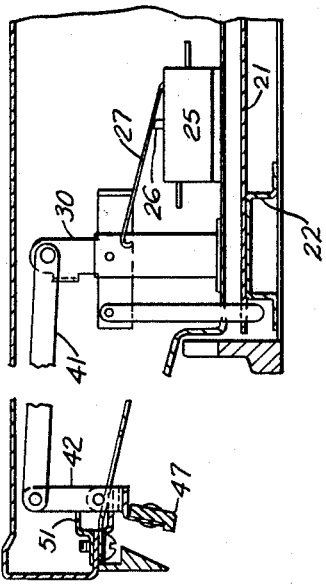
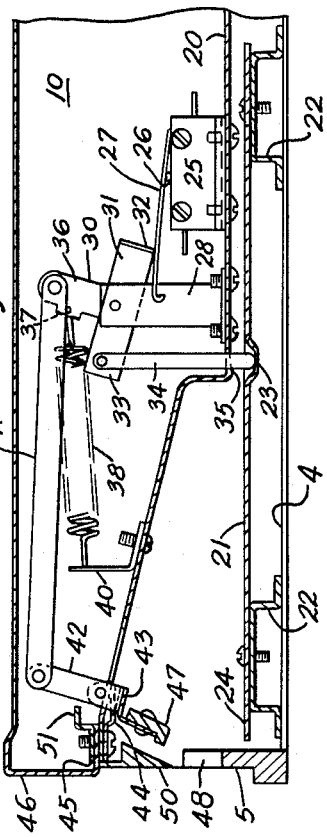
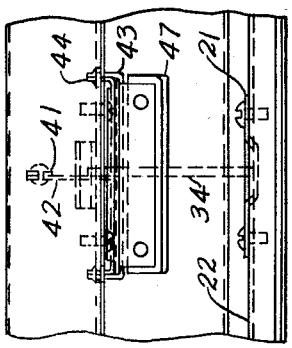
INVENTOR.
Philip J. More
BY
Andrew B. Hubbard
Atty.

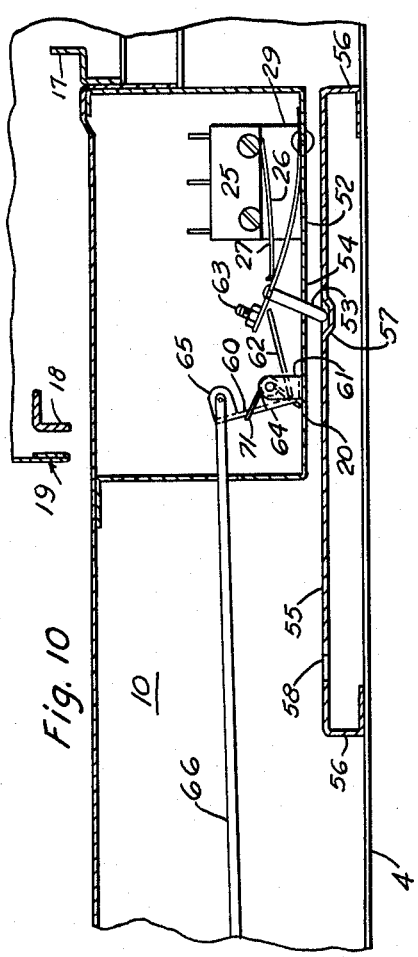
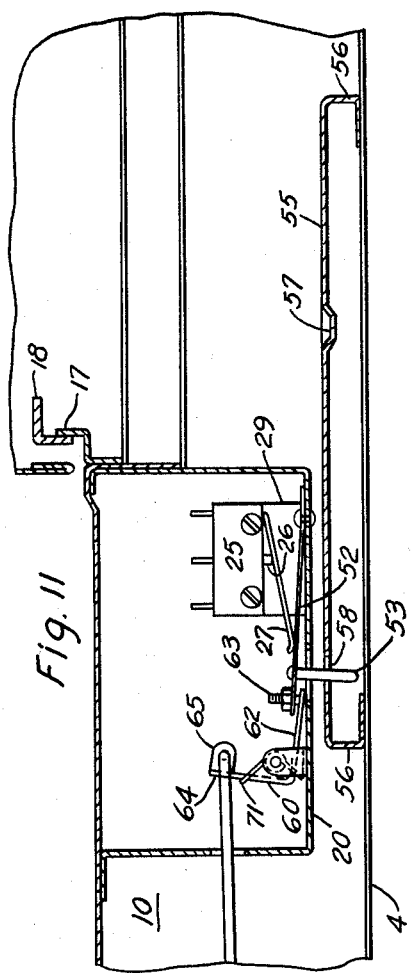
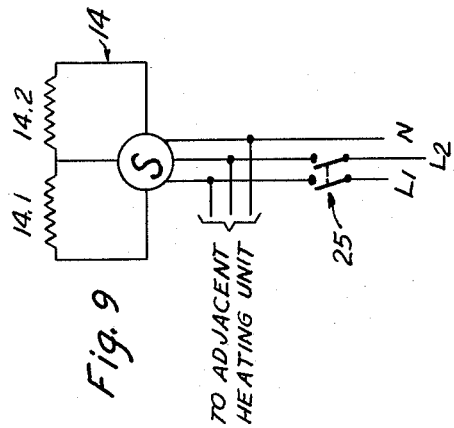
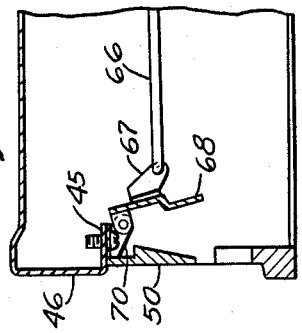

United States Patent Office 3,161,757
Patented Dec. 15, 1964

3,161,757
COOKING APPLIANCE
Philip J. More, Evanston, Ill., assignor to General Electric Company, a corporation of New York
Filed Mar. 26, 1962, Ser. No. 182,256
8 Claims. (Cl. 219—444)

This invention relates to cooking appliances in which the surface cooking units are on a drawer-like cooking top which may be manually drawn from a retracted to an operating position, and in particular to cooking appliances in which certain of the cooking units are at least partially covered by overhanging structure when the cooking top is in its retracted position.

It is an object of the invention to embody in a cooking appliance of this type, a master control which will secure the cooking top in its operating position while placing certain cooking units in condition for operation.

It is another object of the invention to provide a master control which must be manually operated to release the cooking top for its return to retracted (i.e. "home") position, and as an action accompanying such operation, to disable the cooking units so that they may not be energized during the return of the cooking top to its home position, or when the cooking top is in any position intermediate between its home and operating positions.

A domestic electric cooking range in which the invention is particularly useful comprises a rectangular cooking top having surface cooking units adjacent the front and the rear walls thereof. The cooking top is arranged for sliding movement between a home position in which the front cooking units are available for service but the rear cooking units are partially within a rear wall structure and therefore unavailable for service, and an operating position in which all of the units are available for service. Electric ranges of this type have achieved great commercial acceptance because of the advantage of having a very large cooking surface available when it is necessary to use the front and the rear cooking units, and a very compact cooking surface on the very many occasions when only the front units need be used.

However, when the cooking top is retracted, the rear units are at least partially covered within an enclosure defined by a rear wall portion of the range body structure, and it is important that such units be disabled before they reach the enclosure.

In a presently preferred form, a master switch for these cooking units is fixed within the drawer-like structure comprising the cooking top. The switch is operatively associated with a drawer latching mechanism which will automatically immobilize the cooking top when it is withdrawn to its operating position, and in an action accompanying the latching operation, will permit the switch to assume a closed circuit condition. When the latch is manually released to free the cooking top for return to retracted position, it restores the switch to open circuit condition and maintains that condition during the return movement of the cooking top. When the cooking top retraction is complete the latching member enters a detent which secures the cooking top in its home position while maintaining the open condition of the switch.

In the accompanying drawings, in which two embodiments of the invention are shown, FIG. 1 is a front elevation of an electric range incorporating my invention;

FIG. 4 is a fragmentary front elevation, with portions of the front panel broken away, showing the accessibility of the latching device for manual operation;

FIG. 5 is a fragmentary side sectional elevation similar to that of FIG. 2, detailing the control mechanism;

FIGS. 6, 7 and 8 disclose the operating relationship of the latching and switching mechanism in positions respectively representative of a full extension, partial extension, and "home" position of the cooking top;

FIG. 9 is a schematic wiring diagram for the master control switch;

FIG. 10 is a side sectional elevation similar to that of FIG. 5, showing a second embodiment of the control mechanism;

FIG. 11 shows the second embodiment in latched position; and

FIG. 12 is a detail of the actuator for the second embodiment.

Figure 1:
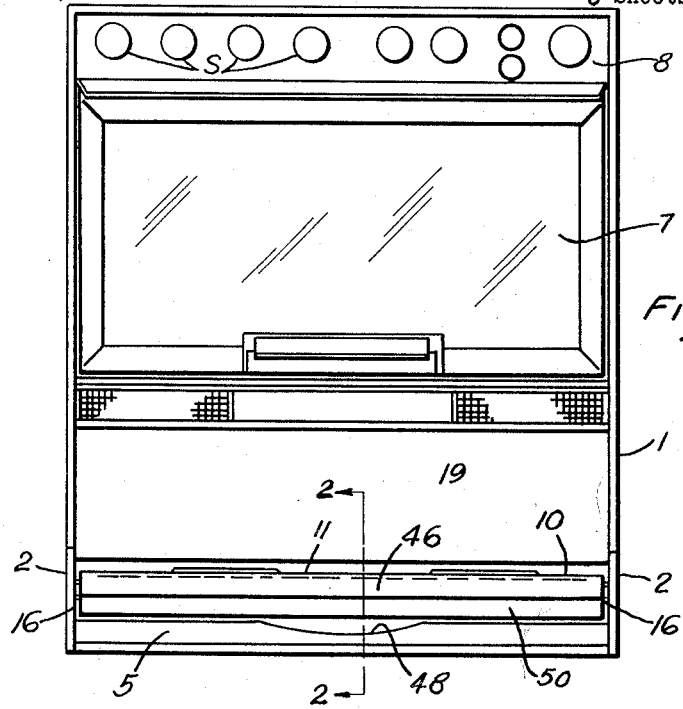
Figure 2:
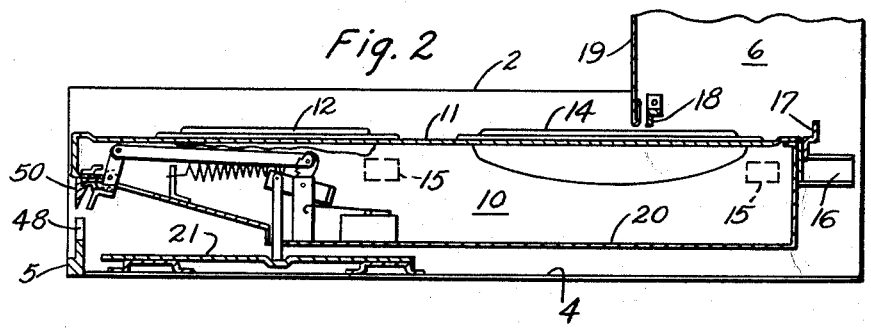
FIGS. 2 and 3 are fragmentary side sectional elevations looking in the direction of the arrows 2—2 of FIG. 1, and respectively showing the cooking top in "home" position and in full operating position.
Figure 3:
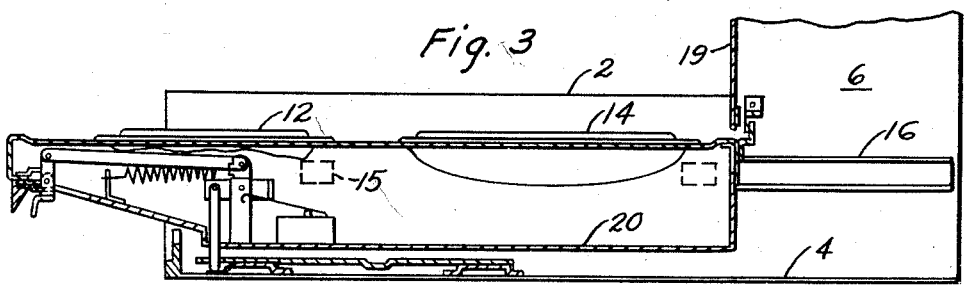

In FIGS. 1 and 2 the electric range comprises a body structure 1 characterized by the parallel side members 2, a base wall 4 extending therebetween, and a front wall 5. Further, the body structure includes a relatively deep back wall structure 6 which can accommodate ventilation fan or filtering systems (not shown) or other components. In the illustrated embodiment the range is of the high oven type, having the oven structure 7 projecting forwardly of the wall 6. The control panel 8 accommodates appropriate switching mechanisms S for the control of the various cooking units. Also, the range includes a hollow box-like structure 10 on the surface 11 of which are located a plurality of heating units for surface cooking operations. Illustratively, the units are of the familiar resistance heated electric type and include a conventional six-inch diameter unit 12 at the front, and an eight-inch unit 14 at the rear; usually there are two sets of such units arranged in a side by side relation. This box-like structure is known in the art as a "cooking top." The side walls of the cooking top 10 are each provided with conventional rollers or guides 15 which are accommodated within slide rails 16 affixed to the inner faces of the side walls 2 permitting the cooking top to be slid to the fully retracted "home" position, or withdrawn to a fully extended "cooking" position shown in FIG. 3, the latter position being established by the engagement of the respective stops 17 and 18. It will be noted that the front panel 19 of the wall structure 6 accommodates the sliding movement of the cooking top and that with the cooking top in home position, each rear cooking unit is partially within the wall structure. It is obvious that whereas cooking operations may be carried out on unit 12 when the cooking top is in its home position, operation of the rear units 14 should be prevented, and that protection against accidental operation of the rear units should be as foolproof as possible.

The present invention provides a master control which combines a switch actuation and cooking top latching means. In each of the embodiments of the invention the master control prevents closure of the master switch until the cooking top is latched in its cooking position. The switch is opened as an incident to releasing the latch and will remain open at all positions of the cooking top rearwardly of its cooking position regardless of how slight the rearward movement may be. Basically, the master control comprises a latching mechanism, a latch operator, and a switch actuator directly operated by the latching mechanism.

Referring first to FIG. 5, it will be noted that the bottom wall 20 of cooking top structure 10 is spaced above the bottom transverse wall 4 of the body structure and is above, but in a closer spaced relation to, a plate 21 suitably secured to the wall 4 as indicated by the brackets 22 spot welded or otherwise fixed to wall 4. Plate 21 has a length appropriately greater than the distance which the cooking top travels between its home position and its cooking position; and said plate has formed therein a detent 23 which is an indication of its home position of the cooking top and a locking aperture 24 which secures the cooking top in its cooking position and provides for the operation of the master switch to closed circuit condition.

The switch 25 is of any conventional pushbutton type capable of handling the total wattage of the two rear cooking units, and is preferably of the type in which release of its actuating button 26 operates the switch from open to closed circuit condition. The switch is secured to the bottom wall 20 of the cooking top. A resilient switch lever 27 is pivoted to the casing of switch 25 so as to overlie the button 26. Pressure on lever 27 will therefore depress the button to open the switch; release of the lever will release the button for movement of the switch to closed circuit condition, it being understood that the button is suitably spring biased so as to operate the switch in this fashion. The actuating lever 27 is operated by a bell crank mechanism which serves the additional function of a latching device.

An upstanding bracket 28 suitably fixed to the wall 20 pivotally mounts the bell crank 30. Bracket 28 is mounted rearwardly of the switch lever 27, as viewed in FIG. 5. The bell crank has a lever mechanism of which one arm, 31, has a projection 32 which overlies the switch lever 27. A second arm, 33, of the lever mechanism pivotally mounts the latch bolt 34 which extends through an opening 35 in the wall 20 to bear against the plate 21. A third arm, 36, has a tab 37 to which an end of a coil spring 38 is attached; the other end of said spring is anchored in a bracket 40 fixed to the wall 20. Said spring urges the bell crank 30 into counterclockwise rotation; the extent of such rotation is limited by the contact of the latch bolt 34 with the plate 21. Also, the arm 36 pivotally secures the link 41, the other end of which is pivotally affixed to an arm 42 extending upwardly from an angle plate 43. Said plate is rotatably mounted in a bracket 44, fixed to a rearwardly extending ledge 45 of the front wall portion 46 of the cooking top 10. A plate 47 is affixed to the angle plate 43, as best shown in FIGS. 4 and 5. Returning now to FIG. 1, it is noted that the front wall 5 has an arcuate cut-out 48 which defines with the trim strip 50 of the cooking top front, an aperture through which the extended fingers of one's upright palm may be passed to grip the rear of the plate 47, whereupon with the thumb against the trim strip 50, the angle plate 43 may be rotated in a clockwise direction to move link 41 rearwardly and rotate bell crank 30 in a clockwise direction.

As noted in FIGS. 5 and 8, the depth of the detent 23 is such that it restricts rotation of the bell crank lever system. The switch lever 27 is held against release, whereupon the switch 25 remains open. The lifting of the locking bar 34 from the detent frees the cooking top, and as the cooking top is drawn forwardly, the rounded end of the bar travels on the surface of the plate 21 as indicated in FIG. 7. During this travel the lever system of bell crank 30 exerts additional effort on the switch lever 27. When the respective stops 17 and 18 engage, signifying the movement of the cooking top to its cooking position, the locking bar 34 will be in registry with the opening 24. As the member 47 is released the effort of the spring 38 on the bell crank drives the bar 34 downwardly into its interlocked position in the plate 21. Engagement of the lever 42 with the stop 51 limits the penetration of the locking bar through the aperture 24 while permitting sufficient rotation of the bell crank to free the switch lever 27 for restoration of switch 25 to closed circuit condition as indicated in FIG. 6.

The simplified wiring diagram of FIG. 9 is representative of the foregoing embodiment as well as the one presently to be described. The control switches S on the control panel 8 are illustratively of the rotary type shown in Kempton U.S. Patent 2,285,210, granted June 2, 1942, and the respective heating units 12 and 14 are of the conventional 2-coil type disclosed in Vogel U.S. Patent 2,357,150. In FIG. 9 the resistance heating elements of the coils of the heating unit 14 are identified as 14.1 and 14.2, and the 230 volt alternating current electric circuit serving the heating unit (and the second, undisclosed, heating unit laterally adjacent heating unit 14) is identified as having line power conductors L1 and L2, and neutral conductor N. The said Kempton Patent 2,285,210 explains in detail the several circuit arrangements and resulting wattage levels of the heating unit; it is unnecessary to repeat them here. However, the switch 25 which illustratively is of the single-throw, double-pole type, is connected into power leads L1 and L2, ahead of the branch circuit to the adjacent (undisclosed) heating unit at the rear of the cooking top. The switch 25 thus exercises master control over the individual switches S serving the rear heating units 14.

In the embodiment of FIG. 10, the master control has been moved to the rear of the cooking top 10. The switch 25 is inverted as respects the earlier embodiment and is fixed to the bottom 20 of the cooking top by a suitable bracket 29. The switch button 26 and lever 27 are as previously noted. Immediately beneath the switch lever 27 and fastened to the base 20 a stiff leaf spring 52 is in operative relation with the switch lever 27. Both spring 52 and lever 27 are biased toward the wall 20, and in all positions of spring 52 relative to said wall, the end of lever 27 will remain in surface contact with spring 52. The locking bolt 53 is affixed to spring 52 near the free end thereof; the bolt extends freely through an opening 54 in the wall 20. The detent and locking plate 55 may be secured to the base wall 4 by channel ends 56 welded to said wall. Said plate has the detent pocket 57 and the latching aperture 58 similar to the detent 23 and aperture 24 of the earlier embodiment. When the bolt 53 is in the detent 57 or bearing against the plate 55 as the cooking top moves to or from its home position, the engagement of spring 52 with lever 27 holds the switch in open position. When the bolt drops through the aperture 58, which coincides with the attainment of the operating position of the cooking top, as seen in FIG. 11, the downward movement of spring 52 will permit the lever 27 to release button 26 to the extent necessary to close the switch circuit.

To actuate the spring 52 against its inherent bias, bell crank 60 is pivotally mounted in a bracket 61 fixed to the base 20. The lever mechanism established by the bell crank includes the member 62 which extends to beneath the end of spring 52; specifically, the end of member 62 extends beneath the adjustment screw 63 provided near the end of spring 52. The second member, 64, of the bell crank lever mechanism has a tab 65 to accommodate a link 66 which extends into the tab 67 of the operator 68 (FIG. 12) immediately behind the front trim member 50 of the cook top. Said catuator 68 is pivotally mounted in the bracket 70 secured beneath the inturned flange 45 of the cooking top front panel 46. A mouse trap spring 71 wound about the pivotal connection of bell crank 60 with bracket 61 and anchored at said bracket and at the lever member 64 of the bell crank, biases the bell crank into clockwise rotation, the limit of which is established by the engagement of the lever member 62 with the wall 20.

The release of the bolt 53 from the detent pocket 57 is by the forward movement of the actuator 6, and the ultimate drop of the bolt through the aperture 58 secures the cooking top in its operating position while enabling the switch 25 to assume a closed circuit condition. Again grasping the operator 6, the user can rotate the bell crank 60 counterclockwise, lifting the spring 52 and its associated switch lever 27 to free the bolt 53 for the return of the cooking top while simultaneously actuating the switch to open circuit condition.

While there have been described what are at present thought to be the preferred embodiments of the invention, it will be understood that various modifications may be made therein, and it is the intention to cover by the appended claims all such modifications as fall within the true spirit and scope of the invention.

I claim as my invention:

1. A cooking appliance, comprising, in combination:

a body structure having a wall;

structure providing a hollow box mounted on said body structure adjacent said wall for movement between a retracted home position and a withdrawn operating position, the top wall of said box having a plurality of electrical resistance heating units;

an electric switch fixed within said box, said switch being in the electric enregy circuit of certain of said resistance heating units, said switch including an arm member having first and second positions respectively establishing said switch in open and closed circuit condition;

a switch actuator pivotally mounted in said box structure in operative association with said switch arm member, said actuator being biased for movement toward said body structure wall;

a latch bolt on said switch actuator, said bolt bearing against said body structure wall to establish said switch actuator in a position maintaining said switch arm in its said first position, said body structure wall having an aperture which said latch bolt enters as said box structure is withdrawn to its said operating position;

means effective upon said entry of said latch bolt to establish said switch arm in its said second position while immobilizing said box structure;

and means accessible from the front of said box structure to rotate said actuator to restore said switch arm to its said first position while releasing said latch bolt from said aperture to permit said box structure thereafter to be returned to its said retracted position.

2. A cooking appliance, comprising, in combination:

a body structure having a transversely extending wall;

structure providing a hollow box mounted on said wall for sliding movement between a retracted home position and a withdrawn operating position, the top wall of said box having a plurality of electrical resistance heating units;

an electric switch fixed within said box, said switch being in the electric energy circuit of certain of said resistance heating units, said switch being normally in closed circuit condition;

a switch actuator pivotally mounted in said box structure adjacent said body structure wall, said actuator being biased for movement toward said wall;

a latch bolt on said switch actuator, said bolt bearing against said body structure wall to establish said switch actuator in a position maintaining said switch in open circuit position, said latch bolt sliding on said body structure wall as said box structure is drawn to its operating position, said body structure wall having an aperture which said latch bolt enters as said box structure attains its said operating position, such entry resulting in movement of said actuator away from said switch to restore the same to closed circuit condition while immobilizing said box structure in its said operating position;

and manually operable means to cause said actuator to return said switch to its open circuit position while releasing said latch bolt from said aperture to permit said box structure thereafter to be returned to its said retracted position.

3. A cooking appliance, comprising, in combination:

a body structure having a forwardly extending wall;

structure providing a hollow box mounted for sliding movement relative to said wall, between a retracted home position and a withdrawn operating position, the top wall of said box having a plurality of electrical resistance heating units;

an electric switch fixed within said box, said switch being in the electric energy circuit of certain of said resistance heating units, said switch having an operating mechanism biased to cause said switch to assume a closed circuit condition;

a switch actuator pivotally mounted in said box structure for engagement with said switch operating mechanism, said actuator being biased for movement toward said wall;

a latch bolt on said switch actuator, said bolt bearing against said body structure wall to rotate said switch actuator to a position in which said switch operating mechanism establishes said switch in open circuit condition, said latch bolt maintaining engagement with said body structure wall as said box structure is drawn to its operating position, said body structure wall having an aperture which said latch bolt enters as said box structure attains its said operating position, such entry resulting in movement of said actuator relative to said switch operating mechanism permitting the same to restore said switch to closed circuit condition while immobilizing said box structure in its said operating position;

and means accessible from the front of said box structure to restore said switch to open circuit condition while releasing said latch bolt from said aperture to permit said box structure thereafter to be returned to its said retracted position.

4. A cooking appliance comprising, in combination:

a body structure including spaced parallel side walls and a base wall extending therebetween;

structure providing a drawer-like cooking top slidably mounted between said side walls above said base for withdrawal to a certain operating position;

means on said cooking top providing electrical resistance heating units;

an electric switch mounted within said cooking top for movement therewith, said switch being in the energizing circuit of certain of said resistance heating units;

an actuator for operating said switch between open and closed circuit positions, said actuator bearing against said base wall to maintain said switch in open circuit condition at all positions of said cook top except said certain operating position;

means responsive to movement of said cooking top to its said operating position to displace said switch actuator into locking engagement with said base wall to immobilize said cooking top while effecting closure of said switch;

and means accessible from the front of said cooking top to disengage said actuator from said base wall while concurrently operating said switch to open position.

5. A cooking appliance, comprising, in combination:

a body structure having a bottom wall and a relatively deep back wall;

structure providing a cooking top having a top wall and side and front wall members depending therefrom;

a plurality of cooking units on said top wall;

means for guiding said cooking top for movement between a cooking position in which all of said units are available and a home position in which certain of said units are at least partially within said back wall;

a master control for said certain cooking units;

a first lever mechanism on said master control to operate the same between conditions respectively enabling or disabling said certain cooking units;

a second lever mechanism operatively associated with said first mechanism to effect the desired operation thereof, said second lever mechanism including a latch bolt;

means on said bottom wall having a detent portion representative of the home position of said cooking top and a portion representative of the cooking position thereof;

and means on said cooking top for operating said second lever mechanism to place said latching bolt in either the said detent portion or the said locking portion of said bottom wall means, said second lever mechanism being effective to cause said first lever to operate said master control to cooking unit enabling condition only when said latching bolt is in the said locking portion.

6. A cooking appliance, comprising, in combination:

a body structure having a bottom wall and a relatively deep back wall;

structure providing a cooking top having a top wall and side and front wall members depending therefrom;

a plurality of cooking units on said top wall;

means for guiding said cooking top for movement between a cooking position in which all of said units are available and a home position in which certain of said units are at least partially within said back wall;

a master control for said certain cooking units;

a lever mechanism on said master control to operate the same between conditions respectively enabling or disabling said certain cooking units;

a bell crank mechanism having an arm member operatively associated with said first mechanism to effect the desired operation thereof, said bell crank mechanism, further, having a latch bolt pivotally mounted thereon;

means on said bottom wall having a detent portion representative of the home position of said cooking top and a locking portion representative of the cooking position thereof;

and means on said cooking top for operating said bell crank mechanism to place said latch bolt in either the said detent portion or the said locking portion of said bottom wall means, said arm member of said bell crank mechanism being effective to cause said lever mechanism to operate said master control to cooking unit enabling condition only when said latch bolt is in the said locking portion.

7. In a cooking appliance having body structure including a bottom wall and a rear wall, a cooking top arranged for movement toward or away from said rear wall, and cooking units on said cooking top which would be at least partially covered by said rear wall upon movement of said cooking top to a home position relative to said rear wall, the improvement in mechanism for disabling said cooking units when in said home position, comprising, in combination:

a master control for said cooking units;

a first lever mechanism for operating said control between a first condition enabling said cooking units and a second condition disabling said units;

a latch bolt;

wall means for engagement by said latch bolt to immobilize said cooking top when the same has been moved to a predetermined position away from said rear wall;

a second lever mechanism for operating said latch bolt between positions respectively engaging or disengaging said latch bolt from said wall means;

and means on said second lever mechanism engaging with said first lever mechanism to actuate said master control to disable said cooking units when said latch bolt is disengaged from said wall means and releasing said first lever mechanism to actuate said master control to enable said cooking units when said latch bolt is engaged with said wall means.

8. A cooking appliance comprising, in combination:

a body structure having a wall;

structure providing a hollow box mounted in said body structure for sliding movement relative to said wall, the top wall of said box having a plurality of heating units;

a detent element on the wall of said body establishing a home position of said box in which certain of said heating units are at least partly within said body structure and a latching element on said wall establishing a cooking position in which said certain units are removed from said body structure;

a normally closed electric switch fixed within said box, said switch being in the electric energy circuit of said certain heating units;

an actuating lever mounted for movement relative to said electric switch, said lever having a first position permitting said switch to assume the closed circuit condition and a second position establishing an open circuit condition of said switch;

a leaf spring mounted at one end on said box and having its free end engageable with said actuating lever, said leaf spring being biased to assume a position in which said actuating lever assumes its first position;

a latch bolt on the free end of said leaf spring;

a bell crank having a lever arm engaging with said leaf spring;

and an actuator on said box for rotating said bell crank, said actuator being operable to a first position to establish said latch bolt in said detent element while causing said leaf spring to move said switch actuating lever to maintain said switch in open circui tcondition, said actuator being operable to a second position in which said bell crank lever arm rotates said leaf spring against its bias to release said latch bolt from said detent to enable said box to be drawn to cooking position while maintaining said switch in open condition, and said actuator being operable to a third position establishing said latch bolt in the said latching element while the said leaf spring releases said actuating lever for the same to assume its said first position.

References Cited in the file of this patent
UNITED STATES PATENTS
2,972,036     Pollock et al. _____ Feb. 14, 1961